Dec. 21, 1954 H. A. QUIST 2,697,443
PRESSURE RELIEF VALVE
Filed Dec. 13, 1951 4 Sheets-Sheet 1

INVENTOR.
HAROLD A. QUIST
BY
ATTORNEYS

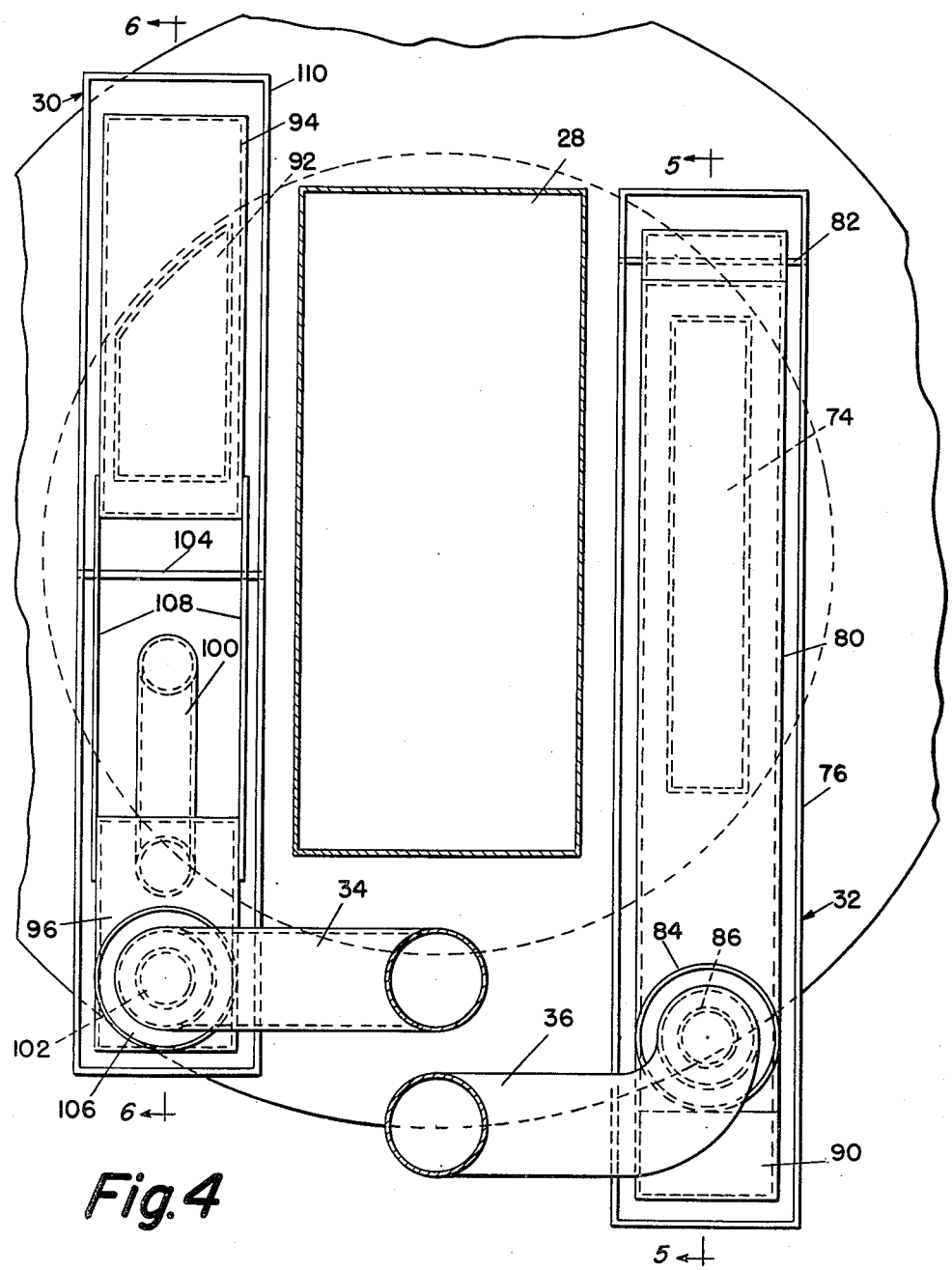

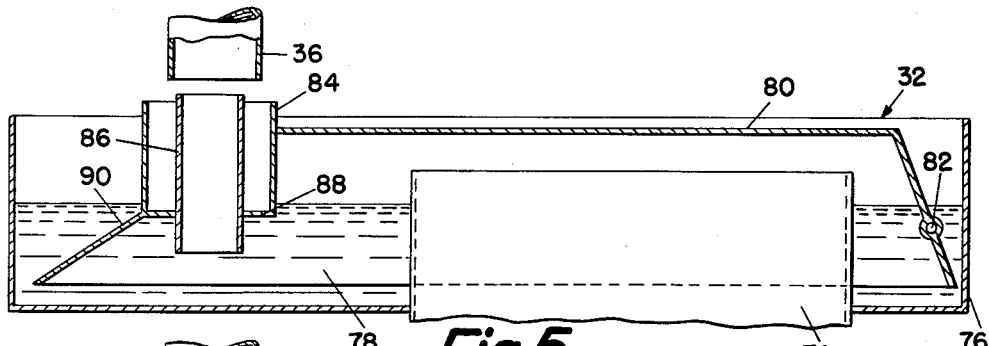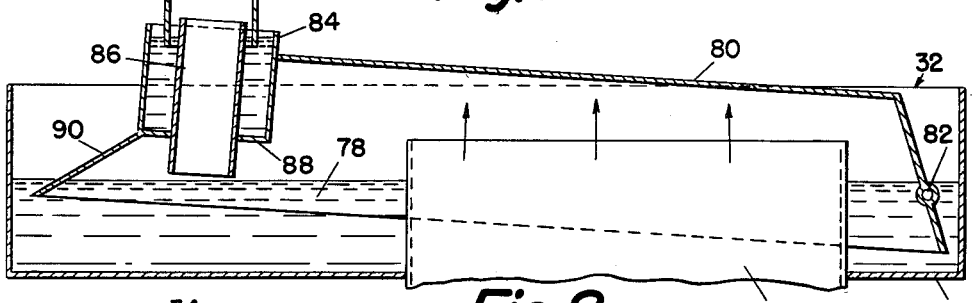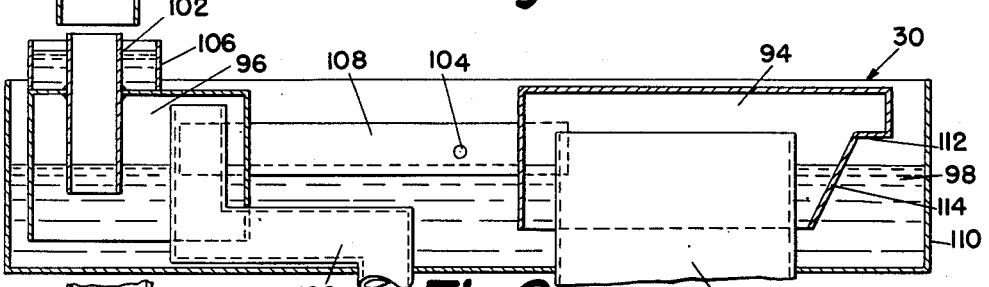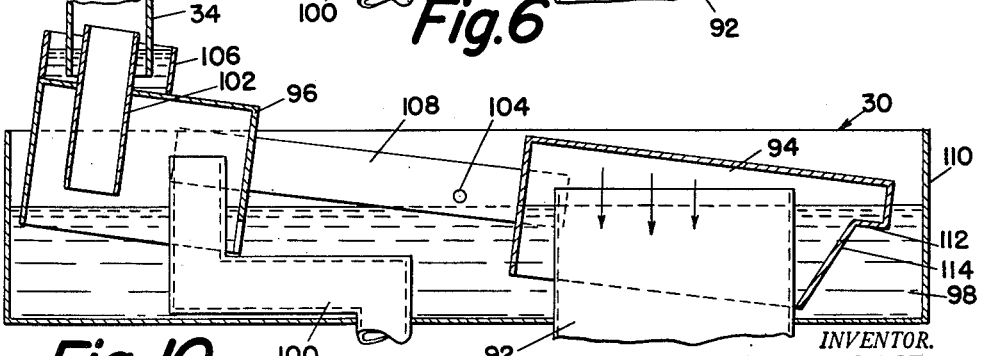

Dec. 21, 1954  H. A. QUIST  2,697,443
PRESSURE RELIEF VALVE
Filed Dec. 13, 1951  4 Sheets-Sheet 4

INVENTOR.
HAROLD A. QUIST
BY
Busser and Smith
ATTORNEYS

United States Patent Office 2,697,443
Patented Dec. 21, 1954

2,697,443

PRESSURE RELIEF VALVE

Harold A. Quist, Swarthmore, Pa., assignor to Sun Oil Company, Philadelphia, Pa., a corporation of New Jersey Application December 13, 1951, Serial No. 261,565

6 Claims. (Cl. 137—248)

This invention relates in general to venting devices for liquid storage tanks and specifically to pressure operated relief valves of the reciprocating type, responsive to either pressure or vacuum conditions in storage vessels.

Normally this form of relief or breather valve is operated in direct response to the excess pressure either positive or negative (relative to atmospheric pressure) in the storage vessel to which it is attached. The direct use of the excess pressure, either as pressure or vacuum, as the sole operating force causes too frequent response resulting in "chattering" or "hunting." To eliminate the use of this force, however, by resorting to separate actuating means as the sole mover for the valve members is to disregard an effective and available force directly reflecting the tank pressure requirements. It is an object of this invention to provide a valve which is operated initially by actuating means responsive to tank pressures and is assisted to complete the relieving operation by tank pressures operating directly on the valve member.

Reciprocating pressure relief devices of the liquid seal type usually employ two valve members to relieve the pressure and vacuum conditions separately. The storage tank pressure is introduced to the valve housing between the valve members and, depending upon the condition to be relieved, operates one or the other of the valves for the specific condition. It is a further object of this invention to provide a single reciprocating valve member of the liquid seal type which is responsive in one direction only to relieve or vent the excess pressure or vacuum condition of a storage vessel.

As noted above, valves of this type, directly exposed to the storage tank pressures as the operating force, tend to "hunt" or "chatter" in response to pressure fluctuations. Various means have been considered to correct this fault which include distributed weights, magnets, and similar devices designed to hold the valve member in the sealed position until a predetermined pressure condition exists in the storage vessel. It is another object of this invention to provide a liquid sealed valve of this type which is maintained in the normal or closed position by balanced atmospheric pressure until a predetermined excess pressure either positive or negative exists within the storage tank, at which time the proper relief or venting operation will take place.

In accordance with the present invention a reciprocatory valve member of the inverted bell type is positioned for vertical movement in a housing containing a cooperating liquid seal. The valve member normally assumes a closed position when not responding to excess positive or negative pressure conditions and is in sealing contact with the liquid. In addition to sealing the storage tank on which the valve is mounted, the valve member is constantly subjected to atmospheric pressure conditions which assist in the operation of the device as will be more clearly understood after reading the detailed operation.

Connected to the valve member in a separate chamber of the valve housing, a pressure responsive mechanism is positioned to reciprocate in response to the pressure changes in the storage tank. The pressure to operate the valve member by means of the pressure responsive mechanism is transmitted from the storage tank by an actuator. The actuator responds to predetermined excess tank pressures, either pressure or vacuum, and transmits a positive operating force to the pressure responsive mechanism. The effective excess pressure also operates upon the portion of the valve member exposed to tank conditions, which assists in the opening movement and thereby makes the valve operation rapid and positive. By reversing the pressures delivered to this mechanism and using atmospheric pressure as a third force in conjunction with the pressure and vacum conditions of the storage tank, the valve member is limited to movement in one direction only during either pressure or vacuum relieving operations.

For a more complete understanding of the nature and scope of the invention in which the above noted objects and others will be evident, reference is made to the following detailed description read in connection with the accompanying drawing in which:

Figure 4 is an enlarged plan view in section of Figure 2 along lines 4—4 rotated clockwise through 90°.

Figure 5 is an elevational view in section of the pressure actuator taken along line 5—5 of Figure 4.

Figure 6 is an elevational view in section of the vacuum actuator taken along line 6—6 of Figure 4.

Figures 7 to 10, inclusive, are elevational views in section of the elements of the device in operation.

The general requirements of all venting or pressure relieving mechanisms is that they preserve the storage equipment and retain as much of the volatile stored material as is economically possible. Consequently, the functions of such apparatus must be positive and performed under predetermined conditions which fulfill these requirements in a satisfactory way. Uncontrolled oscillations of a venting mechanism within an indeterminate range of positive and negative excess pressures will undoubtedly preserve the storage equipment but is not economical of operation due to the loss of the volatile constituents of the stored liquids. Consequently, the control of devices of the nature here considered must be practical within predetermined limits of both pressure venting and vacuum relief.

As has been indicated above, the terms of "pressure" and "vacuum," unless otherwise defined, are used to indicate pressure ranges above and below normal atmospheric conditions. The relief of these conditions arising in storage vessels is limited to excesses of positive and negative pressure. This is clear when it is understood that due to pumping operations and temperature changes, to name two affetcing conditions, there is always a pressure condition present in the storage vessel either above or below atmospheric not amounting in force to the excess requiring relief.

According to the present invention, an inverted bell-type valve member normally engages a liquid seal in the closed position over a relief gas flue on a storage vessel. A pressure responsive mechanism is arranged to lift the valve member from the liquid seal in response to either excess of pressure or vacuum in the storage vessel. Predetermined excess pressure and vacuum are transmitted to the responsive mechanism by actuator means operated by the internal storage vessel excess pressure conditions. Except for the limited area of the valve member exposed to the storage pressure over the relief flue, the pressure actuated elements of the device are not exposed to the flow of relief gases. The effect of the velocity pressure head of the moving gases is thus limited to assisting the operation after it is initiated. However, the predetermined effect of the static pressure in the storage vessel is the operating force which can be controlled within well defined limits.

Figure 1:
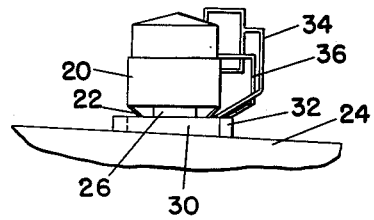
Figure 1 is an elevational view showing the device in operating position.

Referring now to the drawing for a more detailed description of the invention where like numerals designate like elements throughout the figures, Figure 1 shows the device mounted in position ready for operation. A valve housing 20 is mounted by brackets 22 on a storage vessel 24. Connecting the housing 20 to the vapor space of the vessel 24 a manhole 26 or other flanged connection defines the relief gas flue 28. Beneath the valve housing on each side of the connection 26, a vacuum responsive actuator 30 and pressure responsive actuator 32 are arranged. Conduits 34 and 36 transmit the excess vacuum and pressure respectively from the actuators to the valve body 20 as the operating medium.

This description of Figure 1 gives a general idea of the major components of the invention. With the exception of a few of the operating elements yet to be described, the relative positions of these major parts of the device may be changed as desired and need not be assembled as shown for satisfactory operation. Also, the actuating mechanisms here described can be used to operate a plurality of valve members, signaling devices, valves, pumps, and the like, if desired, in the interest of safety and conservation. In the present disclosure, the valve housing 20 is shown as mounted in direct connection with the storage vessel 24 by means of the relief gas conduit of flue 28. Surrounding the top of the upstanding flange 26 a trough 38 for liquid provides a sealing means. An aperture 40 is provided outside the trough 38 which is always open to the atmosphere above the brackets 22. Another trough 42 is arranged concentrically of the trough 38 and the aperture 40 which is deeper than the trough 38 but is substantially at the same elevation in the valve housing. This, too, is adapted to contain a liquid seal.

The valve member 44 is of the inverted bell type provided with double downwardly projecting flanges 46 and 48 positioned to extend into sealing engagement with the troughs 38 and 42 respectively. To assist the proper operation of the device, the flanges 46 and 48 are extended downwardly from the top of the valve member to enter the respective troughs to the same depth. The description of the operation will make this clear.

In the valve body 20 a sufficient distance above the valve member 44 as it rests in the normal or closed position in sealing engagement with the sealing troughs 38 and 42, a horizontal partition 50 divides the valve body interior into an upper and lower chamber. The space above the valve member 44 forms an operating space 52 and is used to receive pressure changes.

Above the partition 50 the space 54 of the valve body 20 is closed by a cover 56 and is removed completely from the effects of relief gas flow and the elements. It is reserved to receive pressure changes for valve operation. In the center of the partition 50 a tube 58 extends upwardly forming an aperture 60 through the partition and one wall of a concentric trough 62. The periphery of the partition 50 where it joins the upper section of the valve body 20 is also formed into a trough 64. Both of these concentrically arranged troughs 62 and 64 are adapted to contain a liquid seal.

A second inverted bell type member 66 with downwardly extending flanges 68 and 70 is positioned in the upper chamber operating space 54 to make sealing contact with the troughs 62 and 64 respectively. As above noted for the flanges 46 and 48 of the valve member 44, these flanges 68 and 70 of the member 66 project downwardly an equal distance. The troughs 62 and 64 are, however, of the same depth and are connected by a pipe 72 which maintains the sealing liquid in these troughs at a uniform depth.

Extending through the aperture 60 in the partition 50, a connector 75 couples the member 66 with the valve member 44. As will be described later, member 66 is responsive to pressure changes in the storage vessel 24, and by means of the connector 75 operates the device to and from sealing contact with the troughs 38 and 42.

Positioned on the top of the storage vessel 24 between the valve body 20 and the roof of the vessel for convenience and economic installation, the two actuators 30 and 32 are located. It will be evident that either or both of the actuators may be relocated as desired provided they are operably connected to transmit excess pressure variations between the storage vessel 24 and the described pressure responsive mechanisms in the valve body 20.

One actuator is designed to operate under excessive pressure conditions while the other responds to excessive vacuum conditions as defined above. In describing these sub mechanisms of the combination, the actuator 32 for excess pressure operation is illustrated generally in Figures 1 and 2, and in detail in Figures 4 and 5. The latter two figures will be referred to in describing the details of this actuator.

Figure 2:
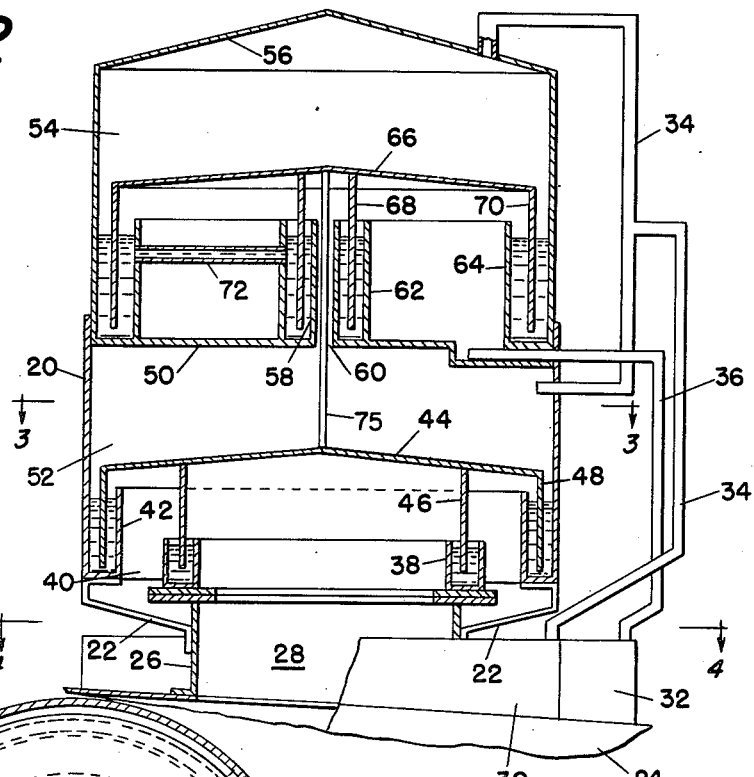
Figure 2 is an elevational view in section of the device shown in Figure 1.
Figure 3:
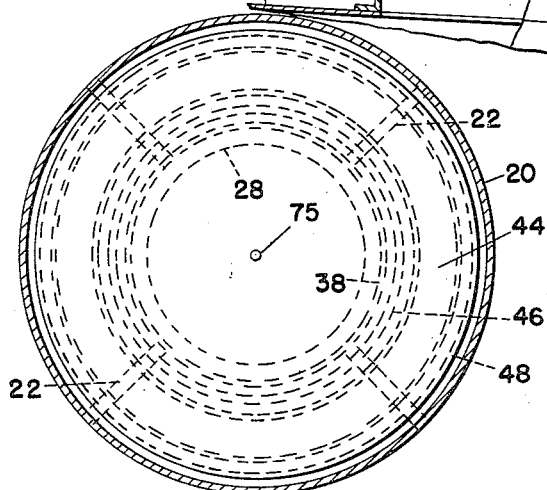
Figure 3 is a plan view in section of Figure 2 along lines 3—3.

In Figure 4, a sectional plan view of Figure 2 taken along line 4—4 and rotated clockwise through 90° in order to get the detail on one sheet, the pressure actuator 32 is shown. The relief gas flue 28 is shown in the center of the sheet as rectangular in section to facilitate placing the actuators adjacent the valve body 20. A pressure transmitting conduit 74 passes through the actuator body 76, as shown in Figure 5, and upward through the sealing liquid 78 to open above the liquid level beneath the oscillating chamber 80. This chamber 80, pivotally mounted at one end in the body 76 at 82, is in the form of an inverted cup, closed over the top and extending into sealing contact with the liquid 78. The free end of the cup opposite the pivoted end supports a cup seal 84, adapted to contain a liquid or sealing gasket and through which a tube connector 86 extends to engage and disengage the pressure transmitting conduit 36.

Accentuation of the operating movement of the pressure actuator is accomplished by means of an accelerator. At the free end of the actuator chamber 80, the cup seal 84 is set in toward the pivot to provide a flat surface 88 normally submerged in the liquid seal. Extending beyond this platform or augmenting pressure area is a sloping section 90. The angle of slope from the horizontal varies with the weight of the material from which the chamber 80 is constructed, the density of the liquid used for the seal, the over-all dimensions of the device, and the selected operating pressure range. Reference is here made to the discussion of the operating characteristics included later in this specification for a complete understanding of this feature of the device.

The vacuum actuator 30 detailed in Figures 4 and 6 is exposed to pressure changes in the storage vessel through the conduit 92. For operational reasons, the pressure receiving chamber of this actuator is divided into two separate inverted cup sections 94 and 96. The chamber 94 is a covered inverted cup open at the bottom to engage the sealing liquid 98 over the conduit 92. The chamber 96 occupies the opposite end of the oscillating element and is inverted to form a seal over conduit 100. A tube 102 is arranged to transmit vacuum from chamber 96 to the conduit 34 when the oscillating element rotates about the pivot 104 and is lifted into operating position. To seal the operating engagement of the tube 102 and the conduit 34, a seal trough 106 to contain either a liquid or gasket encloses the end of the tube and the conduit. The positioning arms 108—108 on each side of the chambers 94 and 96 maintain the device in operating position over the respective conduits. An enclosure or actuator body 110 open at the top, as is also the actuator body 76 of the pressure device, is adapted to contain the sealing liquid 98. Although both the pressure and vacuum actuators are shown open to the atmosphere for clarity and understanding of the operating features, they are enclosed in practice with a shelter which freely admits air at atmospheric pressure but precludes bugs, small animals and the like.

An accelerator is also provided for the vacuum actuator which follows closely the structure described for the pressure element. The chamber 94 is modified to provide a counteracting surface 112 movably positioned above the level of the sealing liquid. A sloping end piece 114 connects this surface with the bottom of the inverted cup. The slope of the closure piece 114 is determined also by the density of the sealing liquid, weight of the material constituting the actuator and the other named influences stated above for the pressure responsive element. The operation of this accelerating device is also reserved for proper comparison with the pressure accelerator and will be fully disclosed in the detailed discussion of the functions of this sub-combination under conditions of excess vacuum relief.

As was indicated above in broadly describing the device as illustrated in Figure 1, the conduits 34 and 36 connect the actuators 30 and 32, respectively, to the valve body. Preliminary to a discussion of the operation of the valve and the merits of this disclosure, a specific description of these connections for transmission of pressure between the operating elements will greatly assist the understanding and purpose of the device. From the description of the actuators 32 and 30, as shown in Figures 5 and 6, it is clear that under normal conditions the conduits 34 and 36 are disengaged from the pressure transmitting means and the valve body is filled with air at atmospheric pressure. This is true with the exception of the area of the valve member 44 immediately covering the aperture 28 which is always subject to storage vessel pressures.

Generally, under all operating conditions the tank pressure or vacuum, not both, is transmitted to the valve body, while atmospheric pressure continues to fill that portion not affected by this pressure transmission. The conduit 34 transmits only an excess vacuum condition, when it exists, to the spaces 52 and 54 above the valve member 44 and the pressure responsive mechanism 66 respectively. Similarly an excess pressure condition does not pass through conduit 34, which is left open to pass air through to these spaces 52 and 54, but fills the conduit 36. This pressure transmitting conduit enters the valve body under the pressure responsive member 66 and delivers the excess pressure there.

In discussing the detailed operation of the relief valve, reference will be made to the elements of Figures 1 through 6 described above in detail. To illustrate the change in position of the movable parts, however, reference will be made to Figures 7 to 10 inclusive. In these latter figures, the effects of the excess pressures both as a positive increase here termed as pressure and for the negative or vacuum condition will be considered.

The effect of excess pressure, as distinguished from normal and excess vacuum conditions, will be described first with particular reference made to Figures 2, 4, 5, 7 and 8. In the first three figures of this group, the elements of the device are shown in the normal or closed position. All the movable parts are resting in contact with liquid seals. The pressure within the storage vessel may be of either positive or negative value relative to atmospheric conditions. In either case, the excess pressure which this device is designed to relieve is not sufficiently great in the considered normal position to cause the venting operation to take place.

In this closed or normal position, the valve member 44 is subjected to the force of both atmospheric and storage vessel pressures. Underneath the valve member the inner area, bounded by the flange 46 which covers the aperture 28, is in contact with the pressure existing in the storage vessel 24. The area between the flanges 46 and 48 is in contact with air at atmospheric pressure entering the valve body 20 through the aperture 40 and between the support brackets 22. The top of the valve member 44 exposed to the space 52 in the valve body is under atmospheric pressure admitted through conduit 34 as described in the general discussion of the operation.

Consideration of the effective pressures in contact with the top and bottom surfaces of the pressure responsive mechanisms 66 shows an equilibrium of forces. As both the actuators 30 and 32 are in the inoperative position shown in Figures 5 and 6, both of these conduits are open to the atmosphere. Air at atmospheric pressure is admitted to both sides of the responsive member 66 holding it in the normal or closed position subject only to its own weight. Under the effects of the pressures acting on the valve elements in this normal or closed position, it is evident no venting or relieving movement will take place without the operation of one of the actuators.

When the excess pressure within the storage tank or vessel reaches a predetermined value sufficiently great to lift the inverted cup 80 of the pressure actuator 32 about the pivot 82 (Figure 8), the tube connector 86 engages the conduit 36. The liquid seal or gasket in the cup 84 engages the conduit and tube in sealing relation and permits the pressure from the inverted cup 80 to pass upwardly through the exposed lower end of the tube 86. The flow of pressure vapor passes from the tank 24 through the flue 74 into the oscillating inverted cup 80 and into the conduit 36 as long as the pressure is in excess of the predetermined operating force.

Operation in response to the predetermined pressure results in the movement as described. However, the response of the pressure actuator 32 and specifically the operation of the accelerator forming a part thereof will be further detailed to fully describe this response. The pressure transmitted to the inverted cup 80 exerts a uniform unitary force upwardly on the exposed undersurface above the liquid in opposition to atmospheric pressure above. An immediate movement about the pivot is started when this force is greater than the atmospheric pressure outside the cup and the weight of the elements. As the accelerator surface 88 breaks the surface of the sealing liquid 78 permitting the internal pressure to become effective on a suddenly increased surface, the result is to accelerate the oscillation.

The retarding effect of the opposing moment of forces due to the end closure 90 of the inverted cup 80 about the pivot 82 counter to the operating force is substantially compensated by the sloping construction of the end closure 90. In describing this detail, it was observed that the angle of slope of this piece from the horizontal depended upon the weight of the cup material, density of the liquid, etc. It will be evident without further discussion that the upward thrust of the flotation vector on the sloping surface is utilized to counteract the gravitational vector component in the downward direction. Such design permits more exact response to the selected operating pressure by eliminating an opposing force of considerable effect.

Figure 7:
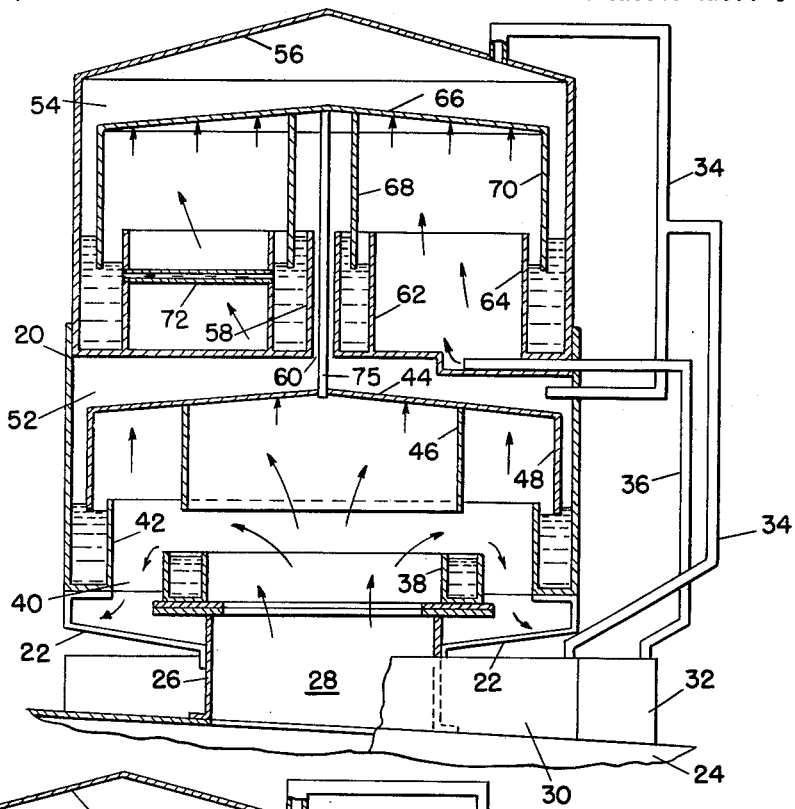

The conduit 36 transmits the pressure condition existing in the inverted oscillating cup member 80 as long as the engaging sealing cup 84 and tube connector 86 remain in contact with it. Reference to Figure 7 shows the flow of pressure by indicating arrows against the exposed surfaces of both the valve member 44 and the pressure responsive member 66. It will be evident that the combined effect of the weights of these two members can with little or no added weight withstand any tank pressure less than the excess which brings the now described elements into action. With the condition existing to transmit the pressure through conduit 36 the entire underneath area of pressure member 66 and the area of valve member 44 within the flange 46 are both affected. Opposing the effect of this pressure lifting the valve member 44 is atmospheric pressure admitted through conduit 34 to the spaces 52 and 54. Figure 6 will indicate that the vacuum actuator 30 will stay open under these pressure conditions by being rotated counterclockwise about the pivot 104 by the pressure force. This construction insures a uniform opposing force which can be considered exactly in the design of the respective elements and insure rapid and positive valve action.

Referring again to Figure 7 which illustrates the maximum opening for venting the excess pressure condition, the position of the valve member 44 is shown as lifted clear of the inner seal trough 38. This trough is shallower than the outer trough 42 and permits the escape of the pressure condition through the aperture 40 to the atmosphere. The flanges of the trough 38 are indicated at the same height which in addition to determining the depth of the liquid seal also act as baffles to direct the relieving gases away from contact with the liquid. The sealing liquid is not entrained by the exhausting gases and the required maintenance is reduced. The outer trough 42 being deeper than the inner trough retains the sealing relation and maintains the effectiveness of the space 52 which would otherwise be filled with various pressures depending upon the condition relieved.

It is now evident why the disclosed embodiment separates the valve body into two chambers 52 and 54 by the horizontal partition 50. The excess pressure transferred from the pressure actuator 30 through the conduit 34 is confined to operate full force against the effective area of the pressure responsive member 66. Also the space 52 is kept free of this pressure which would otherwise counteract the lifting effect by exerting an equal downward pressure on the top of the valve member 44. The liquid in the trough seals 62 and 64 is maintained at uniform depth by means of the pipe 72 and the troughs separate the pressure conditions existing above and below the responsive member 66. Thus the pressure responsive member 66 and the valve member 44 are lifted by the excess tank pressure against atmospheric pressure easily expelled through the conduit 34 as it is displaced.

When the excess pressure condition within the storage tank is vented as described and the force decreases below the value necessary to maintain the oscillating actuator member 80 of the pressure operative actuator in sealed pressure transmitting engagement with the conduit 36, the connection is broken and the member 80 returns into sealing engagement with the liquid in the housing 76. The disengaging movement is accentuated by the relative decrease in pressure supported area the moment the accelerator surface 88 contacts the sealing liquid 78. Air is immediately admitted through conduit 36 to the underside of the pressure responsive member 66 balancing the pressures above and below this member. The top of the valve member is subjected to atmospheric pressure as already described, as well as the greater part of the underside of this member between the two downwardly extending flanges. The limited area of this valve member within the flange 46 is now exposed to a greatly reduced tank pressure not of sufficient force to operate the pressure actuator. Consequently, the valve member is sharply returned without chattering to the closed position as shown in Figure 2, re-establishing the seal which preserves the volatile constituents of the tank contents.

The operation of the device for the relief of excess vacuum conditions in the storage tank will be evident to those versed in the art after reading the above description of pressure venting. However, to emphasize the distinctive features of one valve, one direction of operation, the maintenance of a substantially atmospheric balanced valve and the positive and rapid action of the combination, the vacuum operation will be described briefly.

Reference is made to Figure 2 again as the normally closed position from which the relief of the excess vacuum condition starts. Prior to the creation of the vacuum to be relieved usually caused by pumping out or a decreased temperature condition, the vacuum relieving actuator 30 is as shown in Figure 6. The connected but spaced apart inverted cup chambers 94 and 96 are pivotally supported in sealed relation with the liquid 98 over the conduits 92 and 100. The tube connector 102 is also sealed by the liquid at the lower end and the connecting conduit 34 is open to receive air at atmospheric pressure. Consequently air at atmospheric pressure is transmitted to spaces 52 and 54 in the valve body 20 as well as underneath the pressure responsive member 66. As will be noted, the conduit 36 is admitting air at atmospheric pressure to these spaces because the pressure actuator 32 is disconnected therefrom. Finally, the valve member 44 is subjected, on the underside, partly to tank pressure and partly to atmospheric pressure as described above at the beginning of the pressure venting cycle.

The excess vacuum condition builds up in the storage tank until a predetermined operating force removes the supporting pressure from within the inverted chamber 94 causing the externally operating atmospheric pressure to move the chamber downwardly around the pivot 104, as shown in Figure 10 compared with Figure 6. This movement is not obstructed by the same forces existing within and on chamber 96 as the effective areas of these two chambers are so related as to function as described under preselected operating conditions. Therefore, when the required excess vacuum is reached, the trough 106 enclosing the tube connector 102 is lifted to engage the conduit 34 in sealed relation. The excess vacuum admitted to chamber 96 from tank 24 through conduit 100 is passed to the spaces 52 and 54 in the valve body 20 through conduit 34.

As was detailed above for the pressure operation, a similar accelerating structure is included in the vacuum actuator and serves a like purpose. The inverted cup 94 admits the sealing liquid to the level shown in Figure 6 which does not cover the counteracting pressure surface 112. On the admission of negative or vacuum pressure, the area of 112 balances a like area both inside and out thereby decreasing the effective total force of the externally applied atmospheric pressure. When the downward movement of the cup 94 submerges the area 112, the effect of the counteracting external atmospheric pressure and the internal negative force is removed and the relative effective area suddenly increased. The result is an acceleration which moves the connector tube 102 into immediate sealing engagement with conduit 34. The connecting end 114 of the cup 94 is sloped as described to effectively negative the flotation effect of the sealing liquid and the weight moment to gain greater accuracy, as explained above.

Figure 9:
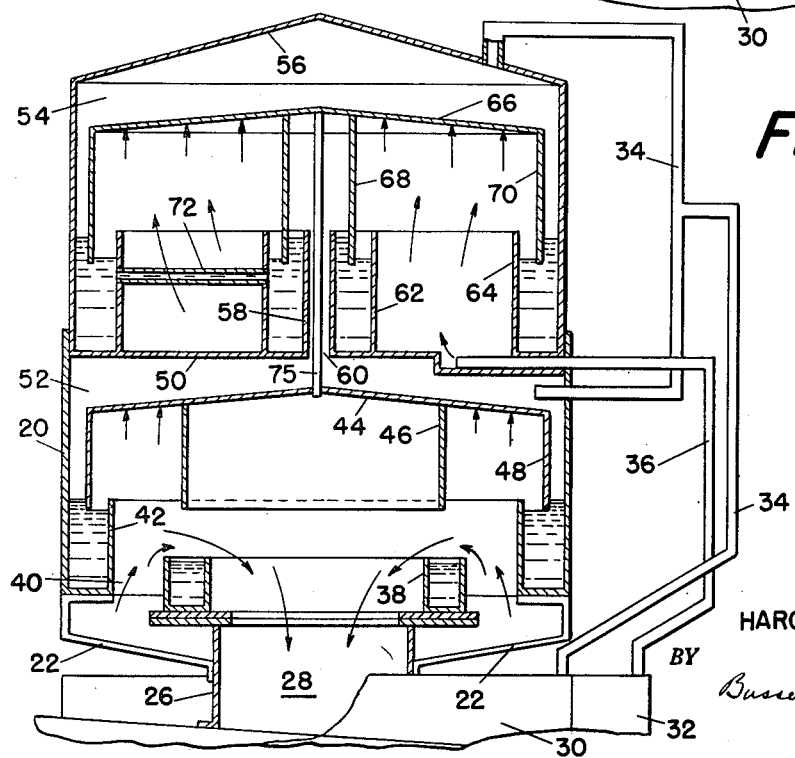

Within the valve body as shown by the arrows of atmospheric force on Figure 9, air is admitted through conduit 36 beneath the pressure responsive member 66. The conduit 36 remains disengaged in the pressure actuator 32 as a vacuum condition causes a downward movement of the chamber 80. An unbalance of pressure is thus established between the vacuum condition of the storage tank and the atmospheric pressure. The differential of the opposed pressures permits the atmospheric force to lift the pressure responsive element against the vacuum condition in space 54. The movement is transferred through connector 75 to valve member 44 which is also proportionately urged upwardly by the difference in the vacuum pressures exerted on the top of the valve and within the boundary of flange 46 beneath the cover, and the upward force of the atmosphere between the flanges on the under side. The valve member 44 now lifted permits air at atmospheric pressure to flow inwardly over the center liquid seal as indicated in Figure 9 and relieve the vacuum in the storage tank. The respective elevations of the liquid seals and their depths as discussed above for the pressure venting operation are maintained for the vacuum relief and serve in the same effective manner.

It will be evident that the relief valve for storage vessels disclosed has many advantages over other valves of this type. Movement in the same direction to vent either the pressure or vacuum condition simplifies the construction details. The design of the respective elements is reduced to relating effective areas and weights of moving parts. These operating relationships need not be altered to balance against reciprocating movements or reverse operations common in relief valves. By varying the density of the liquid seals, weights of the operating elements and other indicated variables of design, the disclosed device can be used under a wide variety of conditions which substantially cover all industrial requirements. In operation, the important feature is the pressure balance of the valve in the closed position where atmospheric pressure is effective on all the moving surfaces.

I claim:

1. A pressure relief system comprising valve means adapted to control the passage of relieving gases therethrough; valve operating means responsive to the pressure conditions to be relieved; pressure actuated means adapted to respond to pressures above and below normal atmospheric pressure; and conduit means, normally open to transmit atmospheric pressures to balance said valve and valve operating means, positioned for engagement by the pressure actuated means moving in response to the pressure condition to be relieved, said conduit means arranged to transmit the actuating pressure condition to said valve and valve operating means for the relief operation.

2. A pressure relief system for storage tanks comprising, in combination therewith, a vent valve adapted to control the passage of relieving gases to and from said tank, valve operating means responsive to pressure and vacuum conditions of said tank connected to the valve, separately responsive pressure and vacuum actuated means operatively connected to receive and respond to the pressure and vacuum conditions in the storage tank, and conduits normally open to the passage of air to the valve and valve operating means positioned to be engaged by the pressure and vacuum actuated means to transmit the actuating tank condition from the respective actuator means to the said valve and valve operating means.

3. A system for venting excess pressures in storage tanks comprising, a housing partitioned into sealed upper and lower chambers, a pressure relief flue extending into the lower chamber, valve means in said lower chamber positioned to normally close said flue in sealing relation, a pressure responsive valve operating member in the upper chamber of said housing operably connected to said valve means, pressure and vacuum actuators adapted to receive and respond to excessive pressure conditions in the storage tank, and conduits normally open to admit air to the housing chambers positioned for operating engagement with the actuators as either responds to the tank condition requiring relief.

4. A system for venting excess pressures in storage tanks comprising, in combination, a housing partitioned into upper and lower chambers, a pressure relief flue extending into the lower chamber, a vertically movable valve member in said lower chamber adapted to contact said flue in sealing engagement in the normal position, a pressure responsive valve operating member in the upper chamber of the housing, a connector between the valve member and said operating member requiring both to move together, peripheral seals in both chambers positioned to receive the valve and operating members in sealing engagement, reciprocable pressure and vacuum actuators adapted to respond to excessive pressure and vacuum conditions, a conduit extending into the upper chamber beneath the operating member normally open to admit atmospheric pressure thereto and positioned to engage the pressure actuator in responsive reciprocation to transmit excessive pressures therethrough, and a second conduit branched to extend into the housing chambers above the valve and operating members normally open to admit atmospheric pressure thereto and arranged to engage the vacuum actuator when the same reciprocates to transmit the vacuum condition through the conduit.

5. A system for venting excess pressures in storage tanks comprising a housing partitioned into upper and lower chambers, a pressure relief flue extending into the lower chamber, an inverted bell type valve member positioned in the lower chamber to reciprocably engage said flue in sealing contact, an inverted bell type valve operating member in said upper chamber, a connector linking the valve member and operating member together, sealing means in both chambers positioned to receive the bell type valve and operating member in sealing engagement, a reciprocable pressure actuator adapted to receive and respond to pressures above atmospheric pressure, a reciprocable vacuum actuator adapted to receive and respond to pressures below atmospheric pressure, and conduit means normally open to conduct atmospheric pressures to the housing chambers and positioned to receive the actuating pressure and vacuum conditions from said reciprocable actuators for transmission to said housing chambers and the operation of the valve.

6. A system for venting excess pressures in storage tanks comprising, in combination, a housing partitioned into an upper and lower chamber; a pressure relief flue connecting the lower chamber of said housing with the storage tank; an inverted bell type reciprocating valve member in said lower chamber positioned to normally close said flue; concentric troughs adapted to maintain a liquid seal in the lower chamber peripherally disposed about said housing and the flue with an aperture to passage atmospheric pressure therebetween, said troughs being of different depths to permit relief of pressures yet seal the space in the lower chamber above the valve member; concentric downwardly projecting flanges from said valve member arranged to engage the concentric troughs in sealing relation; a pressure responsive member of the inverted bell type reciprocally mounted in said housing upper chamber; a connector linking the responsive member and the valve member together through an opening in the partition separating the upper and lower chambers; concentric troughs in said upper chamber adapted to maintain liquid seals about the wall of the housing and the connector aperture; downwardly extending flanges projecting from the pressure responsive member to engage the troughs in the upper chamber at sufficient depth to form a seal in all vertical movements; a pressure responsive actuator and a vacuum responsive actuator connected to receive pressure conditions from said storage tank and respectively reciprocate in response thereto; a pressure conduit normally admitting air into the upper chamber of the housing beneath the pressure responsive member and positioned to receive tank pressure when engaged by the pressure responsive actuator; and a vacuum conduit normally admitting air into the housing above the pressure responsive and valve members adapted to transmit tank vacuum conditions when engaged by the vacuum actuator.

References Cited in the file of this patent

UNITED STATES PATENTS

| Number | Name | Date |
|---|---|---|
| 1,678,700 | McEwan | July 31, 1928 |
| 1,852,141 | Atwell | Apr. 5, 1932 |
| 1,871,943 | Atwell | Aug. 16, 1932 |
| 1,901,576 | Atwell | Mar. 14, 1933 |

FOREIGN PATENTS

| Number | Country | Date |
|---|---|---|
| 516,228 | Great Britain | Dec. 28, 1939 |